J. PETRIE, Jr.
Wool Drier.
No. 1,570. Reissued Nov. 17, 1863.
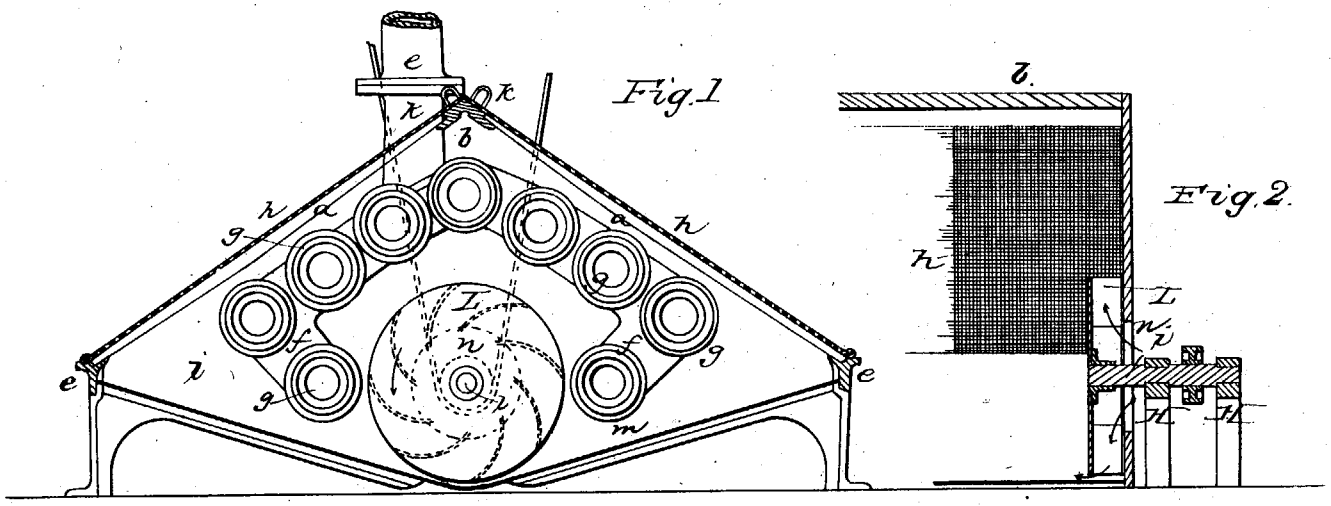
WITNESSES
INVENTOR
John Petrie Jr.
By A. Bolton Atty.
N. PETERS, Photo-Lithographer, Washington, D. C.

UNITED STATES PATENT OFFICE.

JESSE A. LOCKE, OF WATERTOWN, MASSACHUSETTS, ASSIGNEE, BY MESNE ASSIGNMENTS, OF JOHN PETRIE, JR.

IMPROVEMENT IN MACHINES FOR DRYING WOOL.

Specification forming part of Letters Patent No. 34,864, dated April 1, 1862; Reissue No. 1,570, dated November 17, 1863.

*To all whom it may concern:*

Be it known that JOHN PETRIE, Jr., of Rochdale, in the county of Lancaster, England, have invented certain new and useful Improvements in Machinery or Apparatus for Drying Wool or other Fibrous Substances; and I do hereby declare that the following is a full, clear, and exact description of the same.

This invention relates to machinery or apparatus for causing a current of heated or cold air to pass or to be forced through wool or other fibrous substance after the washing or other process by which it is left in a damp or wet state; and the nature of this invention consists in the combination and arrangement of apparatus whereby the placement, drying, and removal of wool and other fibrous substance are facilitated, and economy in apparatus, space, and labor attained.

In the drawings, Figures 1 and 2 represent the apparatus in vertical section, and the length of the same may be varied according to circumstances—*i. e.*, according to convenience of situation or to the quantity of material required to be dried.

In the aforesaid sectional views, *a a* represent two of a series of iron bars, there being a repetition of the same at suitable intervals throughout the length of the apparatus. These bars are secured at top to a ridge-piece, *b*, and at bottom to a longitudinal framing, *c*. The ends of the apparatus are closed by metal or wood work, *l*, affixed to the framing *c* and to the bottom by sheet-iron, *m*. At one end of the box there is an opening, *n*, left for the passage of air. At one end of the chamber thus formed is a pipe, *e*, leading from a steam-generator to another pipe, *f*, from which several other pipes, *g*, extend in a longitudinal direction. To the framing *c* are fixed hinges, to which are jointed a series of flaps, *h*, of perforated metal, wire-gauze, or other suitable material adapted in width of suitable size for being turned over; or a flap in one piece may be adapted, if preferred.

H H are the bearings for a shaft, *i*, upon which is mounted a fan, L, to which rotary motion is communicated by any suitable means. The supports for the steam-pipe are not shown in the drawings; but they may be carried by the frame-work or by any other convenient means.

The wool to be dried is placed upon the perforated flaps *h*, and the shaft *i* is then put in motion, by which means air, entering through the opening *n*, will be propelled over the steam-pipes *g*, and from thence through the perforated flaps *h* and the wool thereon. When the wool or other material is sufficiently dried, the flaps may be turned over by the ring *k*, so as to deposit it upon the floor or into any receptacle placed there. The steam-pipes *g* may be united into one at the other end of the machine, at which place I apply any ordinary apparatus for allowing the water of condensation to pass off.

Fig. 3 represents a modification of the apparatus hereinbefore described, in which the steam-pipes are dispensed with and air is used at the ordinary temperature, which leaves the wool in a better state for working. A in said figure is a box or chamber, the sides of which are composed of iron, wood, or other suitable material, covered on the top with perforated metal, wire-gauze, or other suitable material, B, upon which the wool or other substance to be dried is placed. A hole or aperture is made in the end of the box at C, through which the air is drawn by means of an exhausting-fan, D, or other suitable means, a current of air being thus forced downward through the wool and drying it by the operation.

If deemed preferable, the box A may be divided into two parts longitudinally for convenience; but this does not affect the principle of this invention in any way.

Having thus fully described the said improvements and the manner in which the same is or may be carried into effect, what is claimed as the invention of the said JOHN PETRIE, Jr., is—

1. The herein-described machine or apparatus for drying wool or other fibrous substance, the same consisting of a chamber or inclosure closed on top by a perforated or other open-work sheet, arranged to support and maintain in position over the said chamber or inclosure the material to be dried, and having combined with it a fan or its mechanical equivalent to force or draw atmospheric air through the said sheet, substantially as set forth.

2. The combination, with a chamber or inclosure provided with a fan, as described, of an inclined table or tables made of perforated or woven-wire sheets, whereby a larger quantity of wool or other fibrous matter may be acted upon, substantially as set forth.

3. The combination, with a chamber or inclosure and fan, of a perforated or woven-wire flap or flaps, hinged at one side and forming the top of the chamber, for the purpose of facilitating the discharge of the wool, &c., after being dried, substantially as set forth.

4. The combination, with a chamber or inclosure covered on top with a perforated sheet or sheets, or the equivalents thereof, and provided with a fan or fans, as described, of steam-pipes arranged within said inc'osure, in the manner and for the purposes set forth.

5. The general construction, combination, and arrangement of apparatus, consisting of a case or air-chamber, fan, and inclined perforated or woven-wire flaps to receive the wool to be dried, said flaps being disposed so as to expose the wool on an extended surface to the immediately surrounding air, to facilitate its placement, drying, and removal, substantially as hereinbefore set forth.

In testimony whereof I have signed my name to this specification before two subscribing witnesses.

JESSE A. LOCKE.

Witnesses:

THOMAS H. PATTEN,

S. A. ARCHER.